United States Patent [19]

Riedlinger

[11] Patent Number: 4,821,245

[45] Date of Patent: Apr. 11, 1989

[54] ELECTROMAGNETIC TRANSDUCER

[75] Inventor: Ing. R. Riedlinger, Karlsruhe, Fed. Rep. of Germany

[73] Assignee: Richard Wolf GmbH, Fed. Rep. of Germany

[21] Appl. No.: 104,343

[22] Filed: Oct. 2, 1987

[51] Int. Cl.[4] .............................................. H04R 9/00
[52] U.S. Cl. .................................... 367/175; 367/182; 128/24 A; 128/662.03
[58] Field of Search ............... 367/174, 175, 182, 183, 367/184; 128/32, 41, 24 A, 424, 660; 73/632, 668

[56] References Cited

U.S. PATENT DOCUMENTS

| 2,648,837 | 8/1953 | Moance | 367/142 |
| 2,964,730 | 12/1960 | Blanchard . | |
| 3,466,017 | 9/1969 | Malvin . | |
| 3,560,913 | 2/1971 | Copley . | |
| 4,593,703 | 6/1986 | Cosman | 128/660 |
| 4,655,220 | 4/1987 | Hahn et al. | 367/140 |
| 4,674,505 | 6/1987 | Pauli et al. | 128/24 A |
| 4,697,581 | 10/1987 | Endo et al. | 310/29 |

FOREIGN PATENT DOCUMENTS 3312014 10/1984 Fed. Rep. of Germany .

Primary Examiner—Charles T. Jordan
Assistant Examiner—John W. Eldred
Attorney, Agent, or Firm—Willian Brinks Olds Hofer Gilson & Lione Ltd.

[57] ABSTRACT

An electromagnetic transducer for use in generating transient acoustic pulses in particular for medical purposes such as the destruction of kidney stones. The transducer comprises at least one pair of conductors, of which one is held against movement by a carrier having a high sonic impedance, whereas the other is displaceable with respect to the first to actuate an emitter for generating a pressure pulse as soon as both conductors are traversed by contradirectionally oriented currents so as to repel one another. The conductors of each pair are laid parallel to each other and so connected electrically that the portions adjacent to each other in each case of the cooperating first and second conductors can be traversed by the currents fed into the conductors contradirectionally to generate repulsive forces and equidirectionally to generate attractive forces.

21 Claims, 3 Drawing Sheets

ELECTROMAGNETIC TRANSDUCER

FIELD OF THE INVENTION

The invention relates to an electromagnetic transducer, in particular a sonic emitter, for generating transient acoustic pulses of high amplitude for medical applications, comprising at least one pair of conductors, of which the first conductor is in each case held with restricted movement by a carrier of high sound impedance, whereas the second conductor is movable with respect to the first and actuates a sound radiating surface for generating a pressure pulse, as soon as both conductors are traversed by oppositely oriented currents and are concurrently repelled one from the other.

DESCRIPTION OF THE PRIOR ART

To generate high-intensity pressure pulses, for example as required in medical technology for targeted disintegration of tissue or of concretions in the bladder, kidney or gall bladder, transducers of various kinds have been utilised until now. There are thus transducers in which the element emitting the sound is energised inductively by means of magnetic coils, or piezoelectrically.

Electromagnetic transducers are also known, for example as described in German Patent Application No. OS/33 12 014 in which the emitter surface is formed by the surface of a metal diaphragm which is insulated, is situated opposite a conductor system with mutual spacing and forms with it a pair of conductors. If the conductor system formed for example by a spirally coiled wire, is acted upon by a current pulse, the field thereby generated induces an oppositely directed current in the movable diaphragm, thereby repelling the diaphragm and generating a positive pressure surge. This consequently applies to transducers which operate in accordance with the eddy current principle.

Transducers of this nature have the disadvantage that they may be operated as transmitters only and that in case of irregular configuration of the eddy currents in the flexible diaphragm, sufficiently precise focussing of the pressure wave will be impossible. A high degree of inductance can be expected moreover because of the commonly spiral arrangement of the conductor present in a carrier, so that commensurately great voltage pulses will also be required to operate this transducer. It should finally also be borne in mind that a transducer of this kind generally only renders it possible to generate positive sound pulses, without cavitational effects, and consequently without traction stresses on the tissue or concretion which is to be destroyed.

SUMMARY OF THE INVENTION

It is accordingly an object of the invention to provide a transducer, primarily for medical purposes, and in particular the deliberate disintegration of tissue and concretions within the body, which may be operated both as a transmitter and as a receiver, so that location of the target may also be performed with this transducer. The transducer should furthermore be capable of generating negative as well as positive sonic pulses. Finally, the transducer should ensure trouble-free operation and precise focussing of the sonic pulses emitted during operation in the transmission mode.

This object is achieved according to the invention in that the two conductors of each pair are located parallel to each other and are so connected electrically, that the respective mutually adjacent portions of the cooperating first and second conductors are traversed by currents of opposite polarity to generate repulsive forces, and by said currents fed codirectionally into the conductors, to generate attractive forces.

Depending on the preselected direction of the first and second conductors mutually affecting each other by their electromagnetic fields, this transducer may thus generate positive or negative sonic pulses as desired whilst in the transmission mode, so that it is possible to operate with positive pulses, for example to break up concretions such as inorganic bodily stones, as well as with negative pulses engendering cavitations, for destruction of biological tissue, such as carcinomae.

The possibility also exists for the transducer according to the invention to be operated as a receiver only or alternately as a transmitter and receiver, for example for locating and disintegrating concretions along the same sonic path.

If the transducer is to operate as a receiver, at least one conductor of each pair is connected to a d.c. supply, in such a way that the displacement of the second conductors in each case, which is caused by an acoustic reception signal impinging on a second carrier bearing the second conductors, induces a voltage in at least one of the conductors which is proportional to the speed of displacement of the second carrier and which may be picked up by means of an evaluator circuit.

It is possible furthermore to feed a high-frequency current to at least one conductor of each pair, so that the capacitive and/or inductive coupling between the first and second conductors may be detected as a measurement of their mutual spacing and for the amplitude of the reception signal, by means of an evaluating circuit.

The conductors may suitably consist of sectional material, such as wires, strips or bands, the spacing between the mutually adjacent portions of the cooperating first and second conductors being smaller than 10 mms if possible, and preferably smaller than 5 mms, to obtain a high coupling factor.

As for the rest, several first conductors located mutually parallel in a plane of the first carrier and traversed equidirectionally by current in one direction may form a parallel array, whereas as many second conductors located mutually parallel in a plane of a second carrier and traversed equidirectionally by current form another parallel array and the conductors or carriers may extend straight or in a curve as desired. In this case, the two parallel arrays referred to may be connected in series to generate repulsive forces and in parallel to generate attractive forces.

If the carrier comprising the displaceable conductors is constructed as a plane component, this produces a planar emitter so that an element concentrating the emissions would have to be provided to focus the sound waves which are emitted. The possibility also exists however for the carriers for the first and second conductors to be constructed as focussing components from the start, for which purpose it would be possible for example to use carriers in the form of concentric spheroidal caps.

Further objects and advantageous features of the invention will become apparent from the following detailed description taken in conjunction with the accompanying drawings, which illustrate preferred embodiments thereof.

DETAILED DESCRIPTION OF THE PREFERRED EMBODIMENTS.

Figure 1:
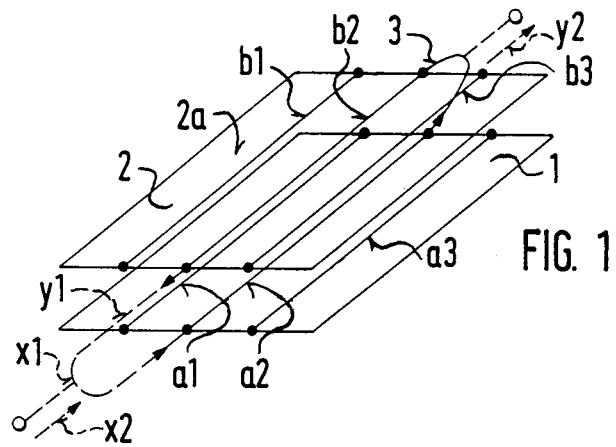
FIG. 1 shows one possibility for the arrangement and connection of first and second conductors in accordance with a first embodiment of the invention.

According to FIG. 1, a first stationary carrier 1 has three first conductors a1, a2 and a3 arranged on it, which are appropriately opposed by three second conductors b1, b2 and b3, which are similarly installed in or on a second movable carrier 2, in such a way that the two conductors of each pair a1, b1, a2, b2, a3, b3 which are directly adjacent and co-operate directly are in each case mutually parallel. The carriers 1,2 constructed in the form of flat plates in this case are also mutually parallel.

The conductors a as well as the conductors b, are in each case so connected electrically at the extremities of the carriers 1,2 as to form two parallel arrays, which are connected in series with a bridge 3. If current is then fed into the conductors of the first carrier in the direction of the arrow x1 and this current leaves the array again in the direction of the arrow y1, the first and second conductors a,b are traversed contradirectionally by the current, which will have the result on the basis of the fields and forces engendered, that the second conductors b movable with the carrier 2 are repelled from the first conductors a and thereby from the stationary carrier 1, and are moved upwards, as shown in the drawing. A positive pressure pulse will accordingly be engendered at the surface 2a of the carrier 2 acting as an emitter surface in this case.

If it is intended to generate a negative pressure or sonic pulse, the circuit is simply modified so that the two parallel arrays of first and second conductors a,b are connected in parallel, by establishing the connections shown dash-dotted in FIG. 1 and by feeding in current in the direction of the arrow x2, which leaves the circuit at the other end in the direction of the arrow y2.

All the conductors are traversed equidirectionally by the current in this case, so that they will attract each other and the second conductors b will be displaced with the movable carrier 2 and the emitting surface 2a in the direction towards the stationary carrier 1.

The speed and amplitude of the displacement of the emitting surface and thus also the evolution and amplitude of the positive or negative pressure pulses which may be generated in this manner, depend substantially on the nature of the current pulse fed in and furthermore on the mechanical structure and inertia of the system as a whole.

Figure 2:
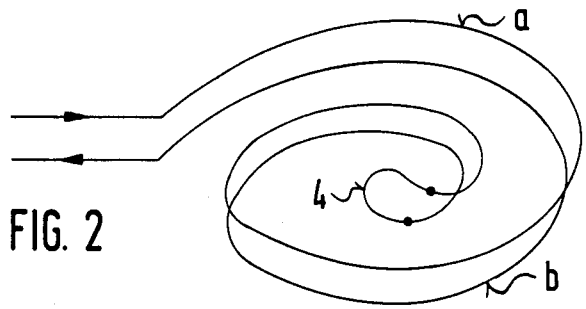
FIG. 2 shows a simplified example of a bifilar pair of conductors in accordance with a second embodiment.

Instead of the rectilinear extension of the first and second conductors shown in FIG. 1, these conductors may also be laid in plane or spatial paths, in angled, curved, loped or meander form. FIG. 2 shows a possible example in this connection, comprising a single pair of conductors, in which to simplify matters, the carriers for the conductors were not illustrated, and in which the first conductor a and the second conductor b are wound in a spiral and joined together at one end via a bridge 4, so that a bifilar system is produced.

In this case, the two conductors are traversed by current contradirectionally upon feeding the current into one of the conductors, so that they will repel each other whilst generating a positive pressure surge. As already described earlier in connection with the example according to FIG. 1, this circuit may however also be modified simply in appropriate manner by causing both conductors to be traversed by current equidirectionally so that negative sonic pulses may also be generated if need be.

Figure 3:
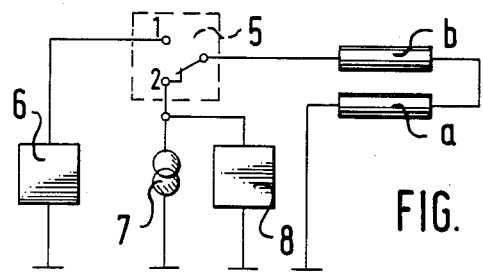
FIG. 3 shows a circuit for a transducer which may be operated as a transmitter and receiver.
Figure 4:
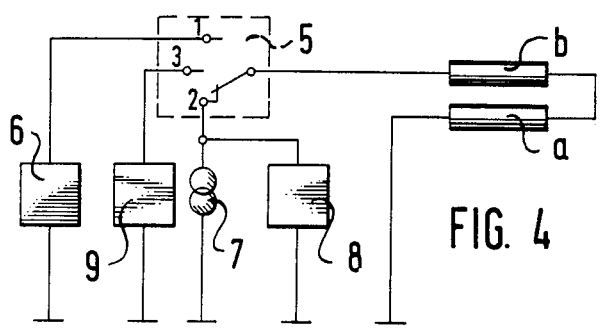
FIG. 4 shows a circuit similar to that of FIG. 3 but with an additional possibility of operating in the transmission mode.

As has already been stated above transducer systems of this kind may be operated not only as sonic transmitters but also as receivers. In this connection, FIGS. 3 and 4 show practical ways of operating the transducer of the invention as a transmitter and receiver. To this end, the first and second conductors a,b are depicted in the drawings as coils or inductances, which are connected in series. If the switch 5 is in position 1 for transmitting, the conductors or coils are energised by HT pulses from a generator 6 and traversed by the current contradirectionally. Assuming that the coil a is stationary and the coil b comprising an emitting surface (which is not illustrated) is displaceable with respect to the stationary coil, positive sonic pulses are generated in this case. In the other possible position 2 of the switch 5, the transducer acts as a receiver. To this end, the required premagnetisation of the two conductor systems or coils a,b is performed by means of a d.c. source 7. If a sonic pulse strikes the radiation or transducer surface combined with the displaceable conductor system b, this conductor system is deflected and displaced with respect to the other conductor system a, so that magnetic induction will cause a signal current to flow which may be processed, indicated and evaluated as a directional quantity for the reception signal, in an evaluator circuit 8, for example an oscilloscope.

Scanners which are utilised alternately as transmitters and receivers are commonly operated during location of concretions or morbidly affected tissue within the body of a patient, the same transducer initially delivering a transmission pulse and thereupon being switched over to reception to pick up the echo signal. This mode of operation is also possible with circuitry according to FIGS. 3 and 4, provided that the switch 5 is a rapid electronic switch and the change-over from position 1 to position 2 occurs within the running period of the outward and return travel of the sonic pulse. The parameters, such as an amplitude, running period and phase, of the echo signals may then be evaluated conventionally for location purposes.

FIG. 4 also shows the possibility of utilising a pulse generator 9 for location purposes, which is of comparatively low power and is switched to the conductor systems a,b at the position 3 of the switch 5, whereas the echo signal may as previously described be received at the position 2 of this switch. In this case, it should consequently be possible to shift the switch rapidly from position 3 to position 2, if the locating operation is performed with a transducer.

The generator 6 is on the other hand used only to generate sonic pulses of high intensity, that is to say for destruction of a concretion or piece of tissue after the locating operation.

Figure 5:
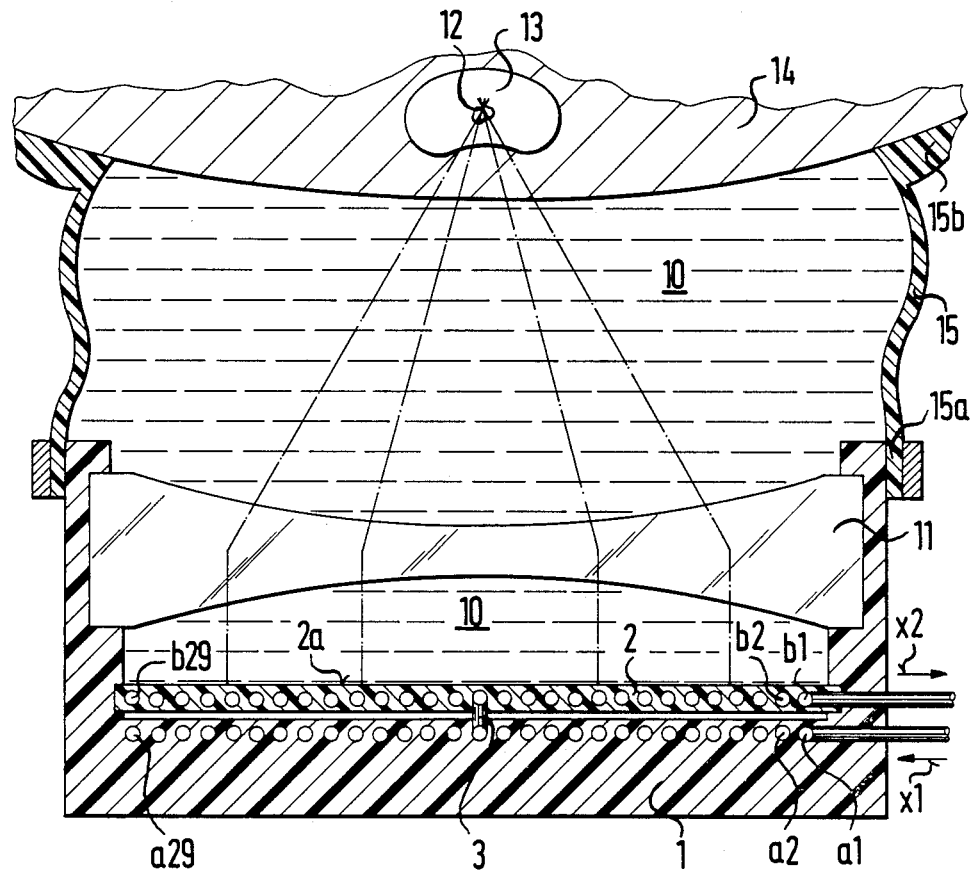
FIG. 5 shows a longitudinal section through an apparatus for disintegration of concretions, incorporating a transducer in accordance with the invention.
Figure 6:
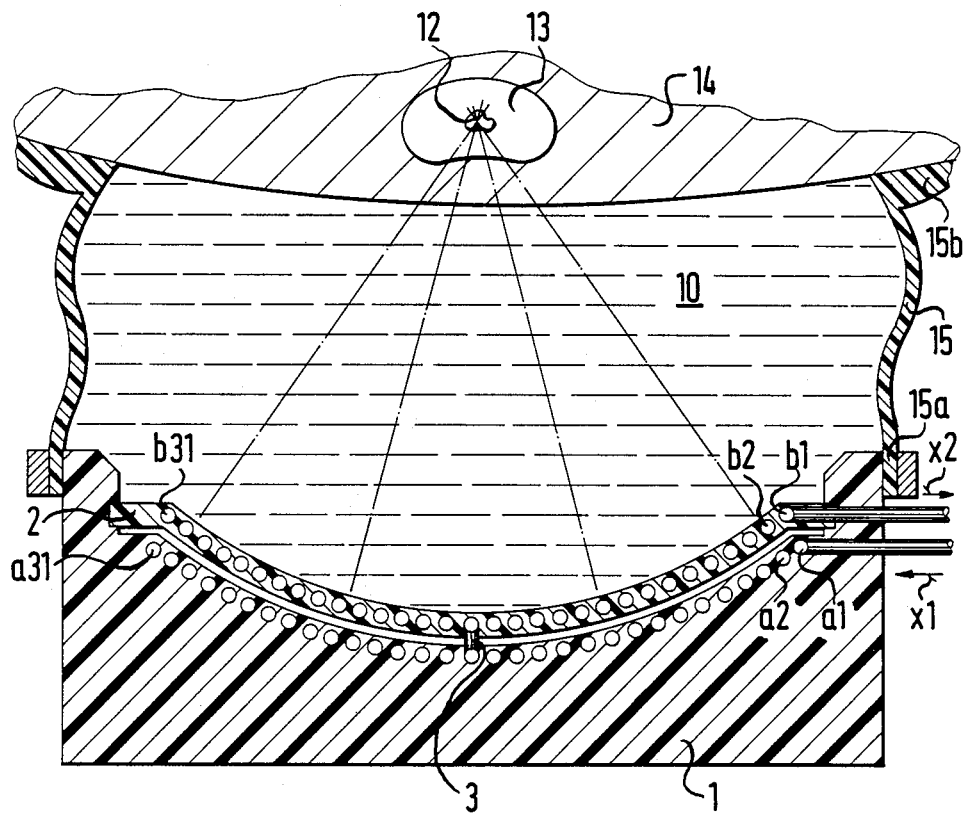
FIG. 6 shows a longitudinal cross-section through an alternative form of apparatus for disintegrating concretions.

FIGS. 5 and 6 show devices and apparatus incorporating transducers according to the invention for the location and destruction of kidney stones and the like. During the following description of these instruments, the same references are utilised for parts corresponding to those shown in FIGS. 1 and 2, for a clearer grasp.

According to FIG. 5, the stationary conductors a1, a2 ... a29 are embedded fixedly in a plastics material housing acting as a carrier 1, that is to say in such a way that they are situated at a minimum distance from the two other conductors b1, b2, ... b29 which are embedded in a second carrier 2 comprising the plane emitter surface 2a. As in the circuit according to FIG. 1, the conductors a and the conductors b may in each case form a parallel circuit and these two parallel circuits may be connected in series electrically via a bridge 3. The current pulses for operating the transducer as a transmitter are fed into the parallel circuit comprising the conductors a in the direction of the arrow x1, so that the current finally flows back in the opposite direction via the bridge 3, through the parallel circuit formed by the conductors b and will finally leave the system in the direction of the arrow x2.

Under these conditions, the current pulse will lead to a mutual repulsion of the two conductor systems, so that the carrier 2 will move upwards in a pulsed manner and emit a sonic pulse through its emitter surface 2a into the transmission medium 10, which may for example be fluid or more particularly liquid. The sonic beams are focussed by means of a biconcave lens 11 to a focus 12 which after appropriate location and alignment of the apparatus is situated on or in a concretion in the kidney 13 of a patient, for example. To this end, the body 14 of the patient is coupled direct to the device via the coupling fluid 10, this connection being obtained in a known manner by means of a flexible sleeve 15 which has its lower rim 15a secured on the carrier 1 and bears via its top rim 15b externally on the body 14 of the patient being treated in a recumbent position.

Instead of the planar transducer with a focussing lens according to FIG. 5, a focussing action on the sonic waves may also be obtained as shown in FIG. 6, wherein both carriers 1 and 2 have a spatially curved focussing shape, being constructed for example as concentric spheroidal caps, which have a common focus 12. Furthermore, the structure and function of this focussing transducer are the same as in the form of embodiment according to FIG. 5.

The first conductors a1–a31 are thus embedded in the carrier 1, whereas the second conductors b1–b31 are embedded in the second carrier 2 which is displaceable with respect to the first. In this case too, these conductors may again form parallel circuits which are joined via a bridge 3 and connected in series, so that a current pulse fed into the first conductors in the direction of the arrow x1 and leaving the circuit again in the direction of the arrow x2 will cause a pulsed lifting of the second carrier off the first carrier. This results in a positive pressure surge which will reach the concretion or tissue which is to be destroyed, in a focussed manner, via the fluid 10 and the patient's body 14.

As has already been stated, the clear spacing between the first and second conductors should be a minimum, that is to say should amount to less than 10 mms, and preferably to less than 5 mms. Furthermore, the conductors should be formed from sectional material such as wires, strips or bands, a strip or band shape offering the possibility that the surface of the conductors facing towards the part which is to be destroyed in each case may act as an emitter surface, without this emitter surface having to be formed by the surface of a separate second carrier. Finally, the second carrier could also be omitted in the form shown in the drawings, inasmuch as the second and movable conductors represent an intrinsically rigid and morphologically stable structure which can oscillate.

What is claimed is:

1. An electromagnetic transducer for generating transient acoustic pulses of high amplitude comprising:

first conductor means mounted on a carrier of high sonic impedance and held against movement thereby, an acoustic emitter incorporating second conductor means, said second conductor means being located parallel to said first conductor means and movable relative thereto to cause pressure pulses to be generated by said emitter; and electrical supply means for supplying electric current pulses to said first and second conductor means, said supply means being operable as required to supply said pulses contradirectionally to said first and second conductor means to generate a repulsive force between them whereby said acoustic emitter generates a positive pressure pulse, and co-directionally to generate an attractive force between them whereby said acoustic emitter generates a negative pressure pulse, said carrier and said acoustic emitter being so mounted, and said first and second conductor means being so coupled electromagnetically, that said carrier and said acoustic emitter comprise means for generating said positive and negative pulses of magnitudes effective to disintegrate a concretion within living tissue and to destroy living tissue through cavitation, respectively.

2. A transducer as claimed in claim 1, wherein said first and second conductor means each comprise an array of elongate parallel conductors, and the spacing between mutually adjacent conductors of the co-operating first and second conductor means is less than about 10 mm.

3. A transducer as claimed in claim 2, wherein said spacing is less than about 5 mm.

4. A transducer as claimed in claim 2 wherein said elongate conductors are in the form of wires.

5. A transducer as claimed in claim 2 wherein said elongate conductors are in the form of strips.

6. A transducer as claimed in claim 2 wherein the two parallel arrays of said first and second conductor means generate repulsive forces when connected in series and generate attractive forces between them when connected in parallel.

7. A transducer as claimed in claim 1, wherein said first and second conductor means form a bifilar system.

8. A transducer as claimed in claim 1, wherein said first and second conductor means each comprise a single conductor wound in a spiral configuration.

9. A transducer as claimed in claim 1, wherein said acoustic emitter has an emitting surface shaped so as to have a focus, pulsation of said emitting surface being effective to focus sonic pulses at said focus.

10. A transducer as claimed in claim 9 wherein said first and second conductor means are supported by carriers which have the form of concentric spheroidal caps.

11. A transducer as claimed in claim 1 which is also operable as a sound receiver and wherein at least one conductor of each of a plurality of aligned pairs of conductors making up said first and second conductor means is connectable to a d.c. source, in such a way that the displacement of the second conductor means in each case, which is reinforced by an acoustic reception signal impinging on the acoustic emitter induces a voltage in at least one of said conductors which is proportional to the speed of displacement of said second conductor means and is picked up by an evaluator circuit.

12. A transducer as claimed in claim 1 further comprising means for feeding a high-frequency current to at least one conductor of each of a plurality of aligned pairs of conductors making up said first and second conductor means and an evaluator circuit arranged to detect electrical coupling between the first and second conductor means as a function of their mutual spacing.

13. A transducer as claimed in claim 12, wherein said evaluator circuit detects capacitative coupling between said first and second conductor means.

14. A transducer as claimed in claim 12 wherein said evaluator circuit detects inductive coupling between said first and second conductor means.

15. Apparatus for locating and disintegrating concretions and tissue in a patient's body, comprising means for holding a fluid transmission medium for sonic waves, and an electromagnetic transducer as claimed in claim 1 located within said fluid holding means and arranged to emit pressure pulses focussed at a point outside the fluid medium.

16. Apparatus as claimed in claim 15 wherein the first and second conductor means are in a planar configuration and a lens is provided in said fluid medium holding means for focussing said pressure pulses.

17. Apparatus as claimed in claim 15 wherein said first and second conductor means are mounted in carriers of concentric spheroidal shape.

18. An electromagnetic transducer for generating transient acoustic pulses of high amplitude and also being operable as a sound receiver, comprising:
first conductor means mounted on a carrier of high sonic impedance and held against movement thereby, an acoustic emitter incorporating second conductor means, said second conductor means being located parallel to said first conductor means and movable relative thereto to cause pressure pulses to be generated by said emitter; and
electrical supply means for supplying electric current pulses to said first and second conductor means, said supply means being operable as required to supply said pulses contradirectionally to said first and second conductor means to generate a repulsive force between them whereby said acoustic emitter generates a positive pressure pulse, and co-directionally to generate an attractive force between them whereby said acoustic emitter generates a negative pressure pulse,
wherein at least one conductor of each of a plurality of aligned pairs of conductors making up said first and second conductor means is connectable to a d.c. source, in such a way that the displacement of the second conductor means in each case, which is reinforced by an acoustic reception signal impinging on the acoustic emitter induces a voltage in at least one of said conductors which is proportional to the speed of displacement of said second conductor means and is picked up by an evaluator circuit.

19. An electromagnetic transducer for generating transient acoustic pulses of high amplitude comprising:
first conductor means mounted on a carrier of high sonic impedance and held against movement thereby, an acoustic emitter incorporating second conductor means, said second conductor means being located parallel to said first conductor means and movable relative thereto to cause pressure pulses to be generated by said emitter;
electrical supply means for supplying electric current pulses to said first and second conductor means, said supply means being operable as required to supply said pulses contradirectionally to said first and second conductor means to generate a repulsive force between them whereby said acoustic emitter generates a positive pressure pulse, and co-directionally to generate an attractive force between them whereby said acoustic emitter generates a negative pressure pulse;
means for feeding a high-frequency current to at least one conductor of each of a plurality of aligned pairs of conductors making up said first and second conductor means; and
an evaluator circuit arranged to detect electrical coupling between the first and second conductor means as a function of their mutual spacing.

20. A transducer as claimed in claim 19, wherein said evaluator circuit detects capacitative coupling between said first and second conductor means.

21. A transducer as claimed in claim 19 wherein said evaluator circuit detects inductive coupling between said first and second conductor means.

* * * * *